Figure 1:
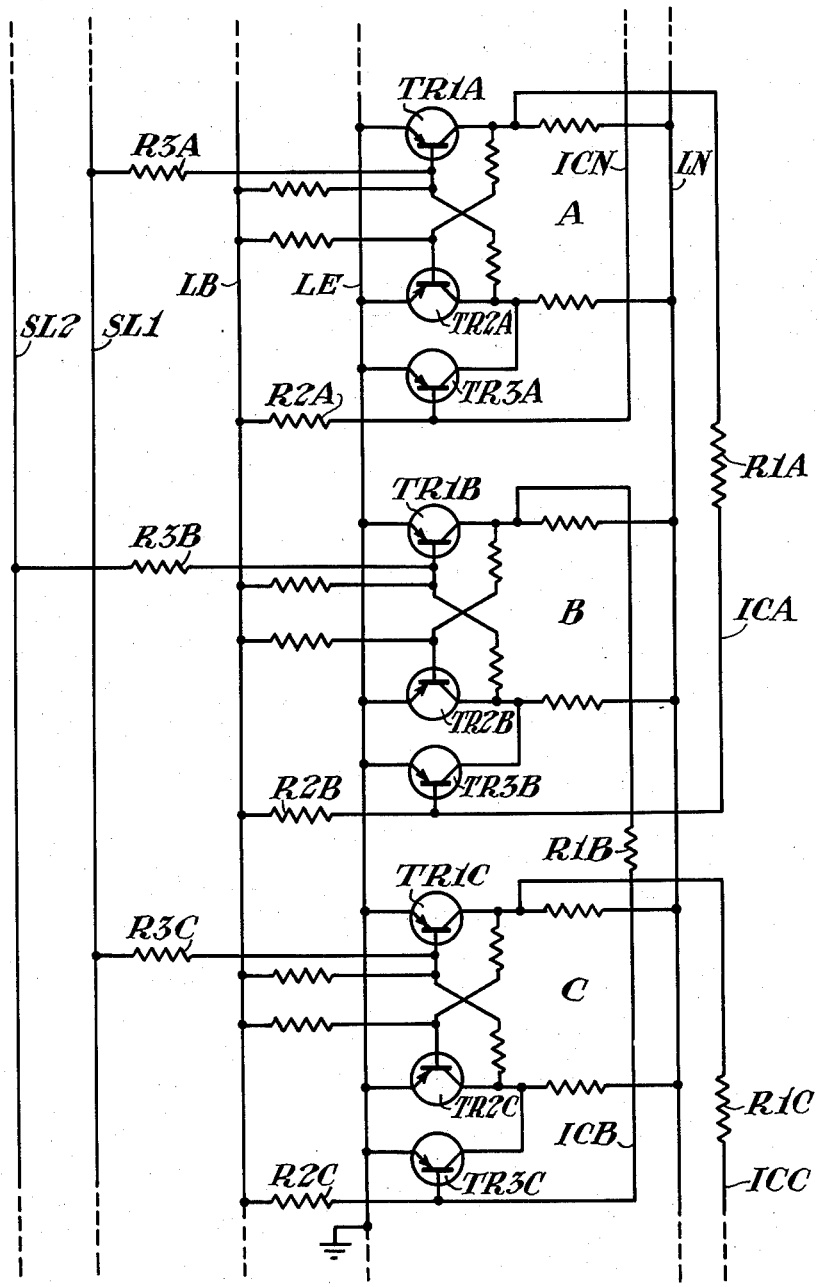

INVENTORS
Stanley Leonard Hurst, Edgar Ian White
and William Ernest New.
BY W. L. Stout
THEIR ATTORNEY INVENTORS.
Stanley Leonard Hurst, Edgar Ian White
and William Ernest New.
BY W. L. Stout
THEIR ATTORNEY

United States Patent Office 2,971,101
Patented Feb. 7, 1961

2,971,101
ELECTRONIC COUNTING CHAINS

Stanley Leonard Hurst, Edgar Ian White, and William Ernest New, London, England, assignors to Westinghouse Brake and Signal Company Limited, London, England Filed Oct. 30, 1959, Ser. No. 849,831

Claims priority, application Great Britain Nov. 13, 1958

13 Claims. (Cl. 307—88.5)

Our invention pertains to electronic counting chains. More particularly, our invention pertains to electronic counting chains using transistors, all of a like type, connected into bistable circuit stages which in turn are interconnected to accomplish cascaded counting action.

Electronic counting chains are well known in the art, particularly those using bistable circuits. Such chains may be used, for example, to provide a predetermined pattern or distribution of output pulses from a train of periodic or random input pulses. These counting chains, if driven continuously, may serve as frequency dividers or ring counters. It is generally the practice to apply the input or stepping pulses simultaneously to all stages, or at least simultaneously to alternate stages over two or more input connections. Under such operation, stages must not be actuated by the input pulses prior to their proper place in the counting order. Various means of priming or conditioning a stage by the application of a priming potential just prior to the proper time for its operation, in order to assure a cascaded counting action, have been proposed and used. Another method is to prevent the stepping pulses from reaching, or effecting the condition of, a stage prior to the proper time in the counting cycle. This may be accomplished by shunting the stepping pulses away from all as yet non-actuated stages except that one properly next in order in the cascaded action or by cancelling the effect of the stepping pulses on the remaining stages. One such arrangement is shown in the copending application for Letters Patent of the United States Serial No. 818,195 filed June 4, 1959, by E. I. White for a Counting Chain. We propose to provide other novel methods of accomplishing this type of operation.

Accordingly, an object of our invention is an electronic counting chain which steps or advances one count in its sequential chain action for each stepping pulse applied to the entire chain.

A further object of our invention is an improved electronic counting chain including means for assuring that the stepping pulses do not enter a count into a counting stage until a count has been entered into the immediately preceding counting stage in the cascaded connections.

It is also an object of our invention to provide an electronic counting chain in which the stepping pulses are shunted away from each stage prior to the proper time in the counting order.

Still another object of our invention is an electronic counting chain in which each interstage coupling includes a variable impedance controlled by the preceding stage, the value of the variable impedance being changed at the proper time in the cycle to apply a stepping pulse in the correct order to the succeeding stage.

It is also an object of our invention to provide a variable impedance arrangement in each interstage coupling connection, of a multi-stage electronic counting chain, to normally shunt the stepping pulses, simultaneously applied to several stages, to prevent a counting action by the associated stage prior to its proper time in the counting order.

Another object of our invention is a variable impedance interstage coupling for multistage electronic counting chains which renders the simultaneously applied stepping pulses ineffective to actuate any counting stage except that one next in order in the cascaded counting action.

A still further object of our invention is an electronic counting chain in which variable impedance connections are used to assure that the cascaded counting action occurs in the proper order.

Other objects, features, and advantages of our invention will become apparent from the following description when taken in connection with the accompanying drawings.

In practicing our invention, we use as a counting chain a cascade connected series of bistable circuit stages to successively count a series of input pulses. Each counting stage consists basically of a single bistable circuit comprising two transistors of a like type and the necessary intra-circuit connections to provide bistable operation. Preferably, stepping pulses are applied simultaneously to alternate stages of the cascade connected chain from one source. Similar stepping pulses are then applied intermediate the first pulses to the remaining stages of the chain from a second source. Stepping pulses over the two supply connections thus alternate to provide a continuous series. A count is entered, i.e., the chain advances one count, by the reversal of the conducting condition of each bistable circuit, as actuated by a stepping pulse. Each interstage coupling connection includes a variable impedance and is connected, in the first or preceding circuit of the consecutive, i.e., coupled, pair, in a manner to control the impedance value of the coupling. This interstage coupling is connected in the second or succeeding circuit of the consecutive pair to shunt or dissipate the applied stepping pulses to prevent a change of condition of the second circuit prior to its proper time in the counting order. Conveniently, the variable impedance element, as shown in the present case, is a transistor which is controlled as to whether it is conducting or non-conducting. This transistor may be in addition to those already included in the bistable circuits or may be one of the pair of which each bistable circuit is comprised. In the illustrated form of the invention using the additional transistor, the shunt path is connected, in the second of the two consecutive stages, to the collector of the transistor of the basic pair at which a potential increase occurs when the bistable circuit reverses its condition. The shunt path current prevents the establishment of, or dissipates, the increased potential at that point to cancel any change in the condition of the counting stage. The change in condition of the preceding counting stage is then used to bias the added transistor to its non-conducting condition to interrupt the shunt path, thus priming the associated stage to be actuated by the subsequent stepping pulse to enter a count in the proper order.

In the second embodiment of our invention which is illustrated, the intercircuit coupling is connected to the stepping pulse input for the second circuit of the associated consecutive pair of circuits. The variable impedance shunt path at this coupling normally conducts the stepping pulse away from the second stage circuit to prevent its operation. The value of the variable impedance is controlled from a point in the first circuit of the consecutive pair at which the potential is altered significantly as a result of the change of condition of that first circuit. As actually shown, this point is the collector of the normally conducting transistor in the first stage, that transistor acting therefor as the variable impedance shunt path. Obviously, the shunt is thus opened when this transistor becomes nonconducting at the time that the preceding stage enters a count into the cascaded action.

We shall now describe two electronic counting chains, each embodying a different form of our invention, a binary counting chain arrangement utilizing a modification of the second embodiment of our invention, and shall then point out the novel features of our invention in the appended claims.

Referring now to the drawings:

Fig. 1 illustrates an electronic counting chain of a transistorized type embodying a first form of the interstage coupling connections of our invention.

Figure 2:
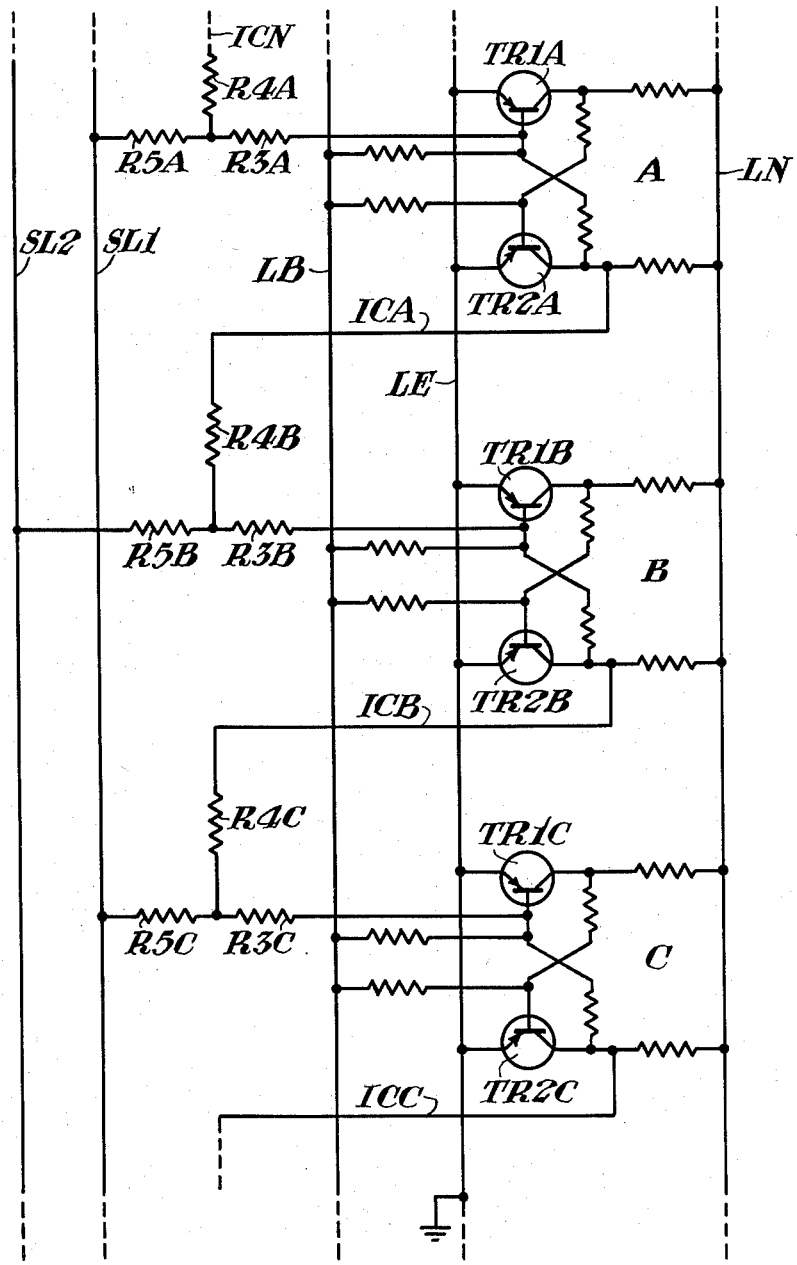

In Fig. 2, a similar type counting chain is shown but embodying a second form of our invention.

Figure 3:
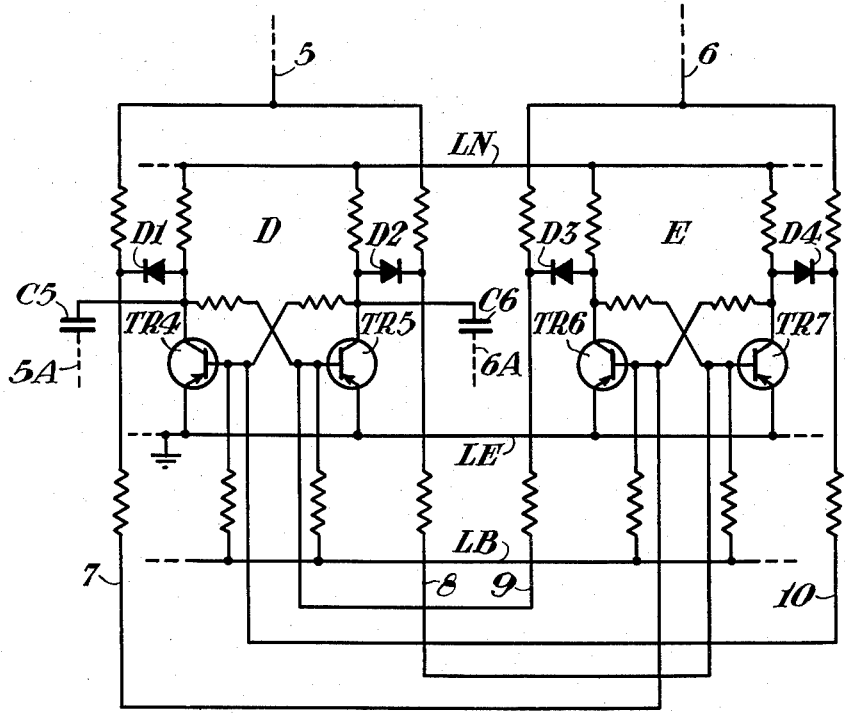

An electronic binary counting chain stage is shown in Fig. 3 which embodies a modification of the second form of our invention illustrated in Fig. 2.

Figure 4:
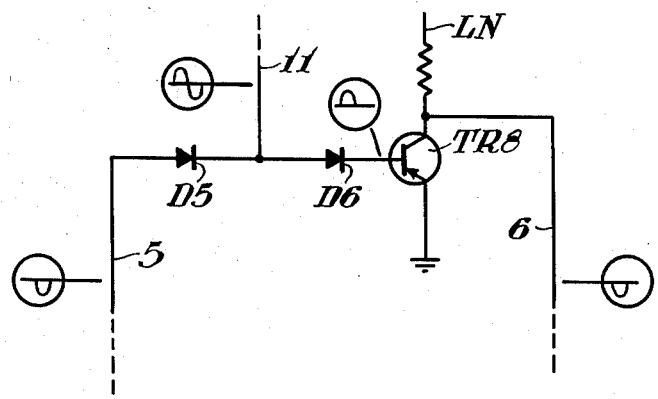

A pulse generator is illustrated in Fig. 4 which may be used with the binary stage of Fig. 3 to provide an alternating current cycle counter.

In each of the figures of the drawings, similar reference characters refer to similar parts of the apparatus. Each of the transistors illustrated in the drawings is assumed to be of the p–n–p junction type. As the description proceeds, however, it will be obvious that other types of transistors, particularly the n–p–n junction type, may also be used by proper rearrangement of the potential source connections. The potentials for the operation of the counting chains illustrated are obtained from a direct current source, for example, such as a battery, having a proper voltage and capacity rating for the apparatus used. However, for purposes of simplicity, the actual source is not illustrated in the drawings. Only the bus wire connections to various terminals of the source are shown, these connections to the positive, the negative, and an intermediate or ground terminal being designated by the reference characters LB, LN, and LE, respectively. Other symbols used throughout the illustrated circuits are conventional and need no further explanation.

Referring now to Fig. 1, three stages of a transistorized electronic counting chain are shown, designated by the reference characters A, B, and C. These three stages may be any three intermediate, consecutive stages in the chain through which the counting action advances in succession from A to C. Each counting stage includes a bistable circuit which comprises two transistors, designated basically TR1 and TR2, which are connected for bistable operation in the well known Eccles-Jordan circuit arrangement. For example, the collector of each transistor, which as heretofore mentioned is assumed to be of the p–n–p junction type, is connected through a resistor to negative potential bus LN. The emitters are directly connected to the ground or zero potential bus LE. The base of each transistor is connected through a biasing resistor to positive potential bus LB, and through another resistor is cross connected to the collector of the opposite transistor of the same circuit. For each stage in this figure and also in Fig. 2, similar elements of the apparatus are designated by identical basic reference characters. To distinguish between the apparatus for different stages, these basic reference characters are modified by letter suffixes which match the stage designation. For example, the basic designations TR1 and TR2, for the transistors in stage A, become the reference characters TR1A and TR2A.

The stages of the counting chain are connected alternately to stepping pulse lines SL1 and SL2. Negative stepping pulses are supplied alternately over these two bus connections from any well known type of pulse generator which is arranged to supply such negative pulses alternately from two outputs. In each stage, the connection is from the base of transistor TR1 to the stepping line. For example, in stage A, the connection is made from the base of transistor TR1A through resistor R3A to stepping line SL1. In stage B, the similar connection is from the base of transistor TR1B to stepping line SL2. Except as modified or controlled by the variable impedance interstage coupling connections which will be explained later, the application of a stepping pulse to a counting stage causes that EJ circuit to reverse its conducting condition. For purposes of this explanation, it is assumed that the normal condition of each counting stage EJ circuit is with transistor TR2 conducting. Of necessity, transistor TR1 is then non-conducting. The application of the negative stepping pulse to the base of transistor TR1 causes it to become conducting and, through the cross connections of the EJ arrangement, transistor TR2 becomes non-conducting. This changeover in the conducting condition of the counting stage enters a count into the chain action. It is believed that such action of the bistable circuits is sufficiently well known and understood in the art that additional explanation is not herein required. It is to be noted that the use of two stepping lines as shown is preferable. However, a single stepping line may be used under certain conditions with each stage connected thereto. It is also to be noted that, although it is here assumed that p–n–p junction type transistors are used, our invention includes the necessary rearrangement of the potential connections for the use of transistors of the n–p–n junction type.

Between each pair of consecutive stages is an interstage coupling connection, designated IC, which includes a resistance divider network comprising resistors R1 and R2 in series. One end of each interstage coupling IC is connected to the collector of transistor TR1 in the preceding stage of the coupled pair, while the other end is connected to positive potential bus LB. The junction between resistors R1 and R2 is connected to the base of an additional transistor TR3 in the second or succeeding stage of the coupled pair. The collector-emitter path of transistor TR3 in each stage is connected in multiple with the similar collector-emitter path of the associated transistor TR2 between buses LE and LN.

In describing the effect of these interstage couplings upon the operation of the chain, it is assumed initially that all three stages A, B, and C are in their normal condition, that is, with each transistor TR2 conducting and of necessity each transistor TR1 non-conducting. If a negative stepping pulse is now supplied over line SL1, its application through resistor R3C to the base of transistor TR1C in stage C has the effect of causing transistor TR1C to become conducting and thus cut off transistor TR2C over the conventional EJ cross connections. At this time, however, since stage B is in its normal state, approximately the full negative potential of line LN prevails at the collector of transistor TR1B. This negative potential creates a negative bias at the base of transistor TR3C over coupling ICB. Transistor TR3C is thus held conducting and dissipates or cancels, by the shunt path through its collector-emitter circuit, the negative potential tending to build up at the collector of transistor TR2C. Consequently, when the stepping pulse in line SL1 terminates, the change of state which this pulse tended to create in stage C can no longer be maintained and this bistable circuit reverts to its normal state. In other words, the non-conducting condition of transistor TR2C cannot be maintained with its collector held at zero potential. Since, transistor TR2C returns to its conducting condition, transistor TR1C must of necessity return to its non-conducting condition, thus restoring counting stage C to its normal state.

Under the same assumed initial conditions, when the succeeding stepping pulse is received over stepping line SL2, its application to the base of transistor TR1B tends to cause the EJ circuit of counting stage B to reverse its conducting condition, so that transistor TR2B will become non-conducting and its collector assume a negative potential. However, in a manner similar to that described for stage C, a negative potential is provided at the base of transistor TR3B over coupling ICA due to the negative potential at the collector of non-conducting transistor TR1A. The shunt path through the collector-emitter circuit of transistor TR3B, in its conducting condition at this time, prevents the establishment of an increased negative potential at the collector of transistor TR2B. Again, as soon as the stepping pulse in line SL2 terminates, dissipation of the negative potential from the collector of transistor TR2B causes the bistable circuit of stage B to resume its intial condition with transistor TR1B remaining non-conducting.

We now assume that a stepping pulse over line SL1 has caused the bistable circuit of counting stage A to reverse its conducting condition so that transistor TR1A is now conducting and its collector is at approximately zero potential. The application of a stepping pulse from line SL2 to the base of transistor TR1B during the following counting step will again cause the bistable circuit of stage B to reverse its conducting condition. However, with stage A already reversed, the negative potential has been removed from the base of transistor TR3B so that this transistor, now positively biased, is no longer in its conducting condition. This interrupts the shunt path, through the collector-emitter path of transistor TR3B, from the collector of transistor TR2B. Thus the negative potential at this latter point is not now dissipated or cancelled and the bistable circuit of stage B, under the influence of the stepping pulse from line SL2, reverses its conducting condition, transistor TR1B becoming conducting. This of course enters a count into the counting chain. At the same time, the shift in the potential at the collector of transistor TR1B, from nearly the negative potential of line LN to approximately the zero potential of line LE, removes the negative potential at the base of transistor TR3C. This transistor is now positively biased and thus becomes non-conducting, priming the EJ circuit of stage C to reverse its condition when the next stepping pulse is received over line SL1.

It is thus apparent that the variable impedance of transistor TR3 in any stage is used to control the counting action of that stage. In other words, the bistable circuit of any counting stage cannot reverse its conducting condition, as a result of an applied stepping pulse, until such time as the associated transistor TR3 has changed from its conducting to its non-conducting condition which occurs when the negative potential at its base, received over our interstage coupling IC from the preceding counting stage, is removed. Although not herein shown, at the end of a counting cycle all of these bistable circuits are reset by external action, preferably simultaneously, to their normal condition in which each transistor TR2 is again conducting. This action is not herein shown as it is well known and is not part of the arrangement of our present invention.

Referring now to Fig. 2, there are illustrated the same three counting stages A, B, and C of an electronic counting chain. Each of these stages in its basic circuit arrangement is identical with that shown in Fig. 1, the conventional Eccles-Jordan circuit arrangement being obvious upon an examination of the drawing. However, the interstage coupling arrangement is changed in order to utilize each transistor TR2 of the regular counting stage circuit as the variable impedance element for the succeeding counting stage. Resistor R3 in each stepping line connection of Fig. 1 is changed to a series resistance network of resistors R3 and R5. The interstage, or rather the intercircuit coupling IC is then connected from the intermediate point between these series resistors to the collector of transistor TR2 in the preceding counting stage, the coupling connection including a resistor R4.

The entire intercircuit coupling, including the emitter-collector path of the associated preceding transistor TR2, is used to shunt the stepping pulses away from the succeeding counting stage rather than cancelling the effect of the stepping pulse upon the bistable circuit as in the arrangement in Fig. 1. In other words, prior to the time in the counting cycle that a circuit properly reverses its condition, stepping pulses applied over its connection with the associated stepping line are shunted to ground over the corresponding coupling IC and the collector-emitter path of the preceding transistor TR2, and will thus have no effect upon the bistable circuit condition. For example, assume that none of the circuit stages shown in Fig. 2 have yet reversed condition so that each transistor TR2 is conducting. A stepping pulse in stepping line SL2, which is normally applied to the base of transistor TR1B, is, with transistor TR2A in its conducting condition, shunted through resistor R4B, coupling ICA, and the collector-emitter path of transistor TR2A to ground bus LE. This prevents the application of a negative potential to the base of transistor TR1B so that this transistor remains non-conducting and the bistable circuit of stage B remains in its initial condition. When the circuit of stage A has reversed its conducting condition, the non-conducting condition of transistor TR2A interrupts this previously traced shunt path. The next pulse supplied over stepping line SL2 thus applies its negative potential to the base of transistor TR1B which becomes conducting. This action results in the reversal of the conducting condition of the circuit of stage B, thus entering a count into the counting chain. During the next subsequent step, a similar reversing action occurs in counting stage C upon the reception of a stepping pulse over line SL1. With transistor TR2B in its non-conducting condition, it is obvious from an inspection of the drawings that the shunt path through coupling ICB is open. The pulse from line SL1 is thus applied to the base of transistor TR2C to initiate the circuit changeover.

Under the arrangement shown in Fig. 2, therefore, prior to the time that a counting stage is properly actuated to advance the count in the chain in its regular order, stepping pulses are shunted away from the corresponding bistable circuit over the intercircuit coupling which acts as a shunt path due to the conducting condition of the normally conducting transistor of the preceding counting stage circuit. It is thus the reversal of the condition of the preceding counting stage circuit that primes or conditions a particular counting stage to respond to the next stepping pulse received from the stepping generator source. This assures proper and orderly counting action as it advances through the counting chain.

Referring now to Fig. 3, there shown is a single stage of a binary counting chain utilizing transistorized bistable circuits. This counting chain includes a modification of the shunt path previously described in connection with Fig. 2 to provide proper operation of this counting stage. Each stage in this chain comprises two bistable circuits of the conventional Eccles-Jordan arrangement, designated in the single stage of Fig. 3 by reference characters D and E. Each bistable circuit includes the conventional intra-circuit connections and connections to the potential buses as previously described for the circuits of the counting chains in other figures of the drawings. In counting stage D the circuit includes transistors TR4 and TR5 while in circuit E the transistors are designated TR6 and TR7. The various intercircuit coupling connections will be described in detail in connection with the operational description to follow shortly. Pulses to be counted are fed into the chain, i.e., into this stage, alternately over input connections 5 and 6 shown at the top of the figure. The arrangement is such that each bistable circuit steers the respective stepping pulses to the other circuit to cause a reversal of its condition to advance the counting action, as will now be described.

Input connection 5 is divided into two branch circuits 7 and 8 which are connected respectively to the bases of transistors TR6 and TR7 of circuit E. Each branch circuit includes a resistance divider network comprising two series resistors. From the intermediate junction point in these resistor networks, shunt paths are connected from circuits 7 and 8 to the collectors of transistors TR4 and TR5, respectively, in circuit D. The position of the transistor in circuit D to which this shunt path for each branch input circuit is connected corresponds to the position of the transistor in circuit E to which the end of the branch circuit is connected. In other words, the shunt path from branch circuit 7 is connected to the collector of transistor TR4 whose position in circuit D corresponds to that in circuit E of transistor TR6, to the base of which the end of branch circuit 7 is connected. Each shunt path includes some form of a diode illustrated as being a half-wave rectifier. These rectifiers are designated D1 and D2, respectively, for the shunt paths corresponding to branch circuits 7 and 8. Input connection 6 divides into branch circuits 9 and 10 which are similar to 7 and 8, each having a series resistance divider network and shunt paths connected from the intermediate junction of these resistors through rectifiers D3 and D4, respectively, to the collectors of transistors TR6 and TR7, respectively. Branch circuits 9 and 10 are connected to the bases of the oppositely positioned transistors in circuit D, branch 9 being connected to the base of transistor TR5 and branch 10 to the base of transistor TR4. It will be noted that in each of the shunt paths, the half-wave rectifier is so poled that its low resistance direction is from the collector of the corresponding transistor to the branch input circuit. Said in another manner, each rectifier is biased in a reverse direction when the associated transistor is in a non-conducting condition so that its collector has a negative potential.

Describing the operation of this stage of a binary counting chain, it is assumed that initially each right hand transistor is in its conducting condition. With transistors TR5 and TR7 conducting, of necessity transistors TR4 and TR6 are nonconducting. A negative pulse applied over input connection 5 passes into branch circuits 7 and 8. With transistor TR5 conducting, the negative pulse in branch circuit 8 biases rectifier D2 in a manner that the negative pulse is shunted over this rectifier and the collector-emitter path of transistor TR5 to ground bus LE, thus rendering the negative pulse ineffective for further action. However, in the shunt path including rectifier D1, the potential on both sides of this rectifier is nearly the same and no shunting action is experienced. With the shunt path thus rendered ineffective, the negative pulse in branch circuit 7 is applied to the base of transistor TR6 in circuit E causing this transistor to become conducting. Of necessity, the condition of the circuit is reversed with transistor TR7 becoming non-conducting under the usual action of such EJ circuit arrangements.

In the operation of this system, the next pulse is applied over input connection 6 and passes into branch circuits 9 and 10. With transistor TR6 conducting, the pulse in branch circuit 9 is shunted through rectifier D3 and the collector-emitter path of transistor TR6 to ground bus LE. This is possible since the collector of transistor TR6 is at zero potential under the existing conducting conditions in circuit E and rectifier D3 is thus properly biased to cause shunting of the negative pulse. With transistor TR7 non-conducting, the potential on both sides of rectifier D4 is nearly the same. The negative pulse in branch circuit 10 is thus not shunted and is applied to the base of transistor TR4 in circuit D. Transistor TR4, under the influence of this negative pulse, becomes conducting and, due to the circuit arrangement, transistor TR5 becomes non-conducting so that circuit D is reversed in its condition at this time. By reference to the drawing, when taken in connection with the previous description, it will be obvious that during the next two pulses applied successively over input connections 5 and 6, the conducting conditions of circuits E and D are reversed back to the initially assumed conditions. During this action, shunt paths D1 and D4 function to shunt the input pulses away from the corresponding branch circuits. The negative pulses appearing in branch circuits 8 and 9 in succession are thus the only ones that are effective to cause the corresponding transistors to assume the conducting condition, thus restoring the original conditions.

The registration of a count in binary form is by the state of a selected one of the bistable circuits in each stage. For transfer of a count to higher order stages in the binary chain, each of such higher order stages is arranged to derive its input over coupling capacitors such as C5 and C6, shown connected respectively to the collectors of transistors TR4 and TR5 of circuit D. These capacitors cause alternate negative pulses to appear in lines 5A and 6A which are further connected as the input to the next higher stage in the binary chain. One such pulse occurs for each reversal of the condition of circuit D only. In a manner similar to that described for the stage illustrated in Fig. 3, this results in one change of state occurring in each higher order circuit for every two in the preceding stage in accordance with the well known manner of counting in binary form.

It is evident from the above description that this form of counter requires two negative pulses for each count of one. Cycles of an alternating current wave may therefore be counted if the positive half cycle is inverted. A circuit to achieve this inversion of the positive half-cycles of an alternating current wave form, in order that the cycles may be counted by an arrangement such as shown in Fig. 3, is illustrated in Fig. 4. In the circuit of Fig. 4, successive negative pulses are alternately applied to lines 5 and 6 which correspond to the input connections 5 and 6 at the top of Fig. 3. It is assumed that, from an alternating current source, an input wave having a sine wave form is received over connection 11, as illustrated by the conventional symbol associated with this input connection. Half-wave rectifier D5 is so poled as to pass the negative half-cycles of this input wave into input connection 5 of the first stage of the binary counting chain, as illustrated by the symbol to the left of connection 5. The positive half-cycles of this input wave are passed through half-wave rectifier D6 to the base of a transistor TR8, assumed to be of the p-n-p junction type. The collector-emitter path of this transistor is connected between negative potential bus LN and a ground connection, which corresponds to potential bus LE. Thus transistor TR8 is normally conducting and becomes non-conducting only during the period that the positive half-cycle from the alternating current wave form is applied to its base. As shown by the conventional symbols, as the base of transistor TR8 receives the sine wave form of the positive half-cycle, its collector assumes a negative potential having a similar wave form and the transistor thus acts as a phase inverter. Input connection 6 of the first stage of the binary counting chain, as shown in Fig. 3, may then be connected to the collector of transistor TR8 so that the inverted half-cycles, each now having a negative pulse form, as are applied to the binary chain. As a result, negative pulses are applied alternately in succession over connections 5 and 6 as required for the proper operation of the binary stage shown in Fig. 3, as previously described.

A binary counting chain using stages comprised of bistable circuits as shown in Fig. 3 which embody the modifications of the second form of our invention, and which may alternately use modifications of the form shown in Fig. 1, have been found to possess many advantages, chief among which are robustness and stability in operation. Such binary chains have been found to operate satisfactorily over a relatively wide range of supply voltages and to be immune to operation by supply voltage fluctuations. Such chains are also tolerant, without faulty operation, to a wide variation of input wave forms at frequencies up to as much as 200 kilocycles per second. It is to be noted, however, that the use of the forms of our invention are not limited to such binary counting chains but may be used in ordinary counting chains for cycling operations, as for example in remote control systems.

Although we have herein shown and described but two forms of electronic counting chains embodying our invention, it is to be understood that various other modifications and changes may be made therein within the scope of the appended claims without departing from the spirit and scope of our invention.

Having thus described our invention, what we claim is:

1. In a multi-stage electronic counting chain, a series of cascade connected bistable circuits each comprising a pair of like transistors, stepping means connected to each bistable circuit for supplying stepping pulses thereto to effect successive reversals of the conducting condition of said bistable circuits to count the stepping pulses, a variable impedance shunt path connected to a selected transistor in each bistable circuit for normally dissipating the effect of said stepping pulses on the corresponding bistable circuit, each shunt path being controlled by the non-selected transistor in the preceding bistable circuit for interrupting the shunt path when the conducting condition of the preceding circuit has been reversed, whereby the counting action is advanced in order through the successive stages of said counting chain.

2. In a multi-stage electronic counting chain, a series of cascade connected bistable circuits each comprising a pair of like transistors and intracircuit connections between the terminals of said pair of transistors, stepping means connected to each bistable circuit for supplying stepping pulses thereto to effect successive reversals in the conducting condition of said bistable circuits to count the stepping pulses, a shunt path including the variable impedance circuit of a normally conducting transistor connected to a selected transistor of each bistable circuit for dissipating the effect of said stepping pulses on the corresponding bistable circuit only when the associated transistor variable impedance circuit is in a conducting condition, the transistor variable impedance circuit of each shunt path being controlled by the nonselected transistor of the preceding bistable circuit for interrupting the corresponding shunt path when the conducting condition of the associated preceding circuit has been reversed.

3. An electronic counting chain, comprising, a series of cascade connected bistable counting circuits each including a pair of like transistors, stepping means connected to said bistable circuits for supplying stepping pulses thereto, each circuit being responsive at times to said stepping pulses for reversing its conducting condition to advance said chain one count, and a variable impedance shunt path of normally low impedance connected to a selected transistor of each bistable circuit at the point of increasing potential when that associated circuit reverses its conducting condition, each shunt path being effective when its impedance is of low value for dissipating the potential increase to cancel any condition reversal of the associated circuit, each shunt path being controlled by the nonselected transistor of the preceding bistable circuit of the series for increasing the impedance value to interrupt the shunt path only when the conducting condition of that preceding circuit is reversed.

4. An electronic counting chain, comprising, a series of cascade connected bistable counting circuits, each including a pair of like transistors, stepping means connected to said bistable circuits for supplying stepping pulses thereto, each circuit being responsive at times to said stepping pulses for reversing its conducting condition to advance said chain one count, and a shunt path including a normally conducting transistor connected to a selected transistor of each bistable circuit at the point of increasing potential when that associated circuit reverses its conducting condition for dissipating the potential increase when the included transistor is conducting to cancel any condition reversal of the associated bistable circuit, the included transistor of each shunt path being controlled by the nonselected transistor of the preceding bistable circuit of the series to its non-conducting condition for interrupting the shunt path when the conducting condition of said preceding circuit is reversed.

5. In a multi-stage electronic counting chain, a series of cascade connected bistable circuits each comprising a pair of transistors of like type, stepping means connected to said bistable circuits for supplying stepping pulses thereto to actuate successive reversals in the conducting condition of said bistable circuits, an intercircuit coupling between each consecutive pair of bistable circuits including a variable impedance shunt path, each shunt path being connected to a transistor in the first circuit of the associated consecutive pair for controlling the impedance to shunt the stepping pulse to prevent a reversal of the conducting condition of the second circuit until after the conducting condition of the first circuit has been reversed.

6. An electronic counting chain having a plurality of counting stages each comprising a bistable circuit including electronic devices, means connected to said stages for supplying operating potentials to said devices, stepping means connected to said stages for supplying stepping pulses thereto for actuating successive reversals in the conducting condition of the bistable circuits to count the stepping pulses, a variable impedance means coupling each pair of consecutive stages for providing a shunt path for the stepping pulses applied to the second of the associated pair of consecutive stages, each variable impedance means being controlled by the first of the associated pair of consecutive stages for interrupting the shunt path for said stepping pulses when the conducting condition of the first stage bistable circuit is reversed, thereby assuring cascaded counting operation by said chain in response to successive stepping pulses.

7. An electronic counting chain including a plurality of bistable circuits, means connected to said circuits for supplying operating potentials thereto, stepping means connected to said circuits for supplying stepping pulses thereto for actuating successive reversals in the stable conducting condition of the circuits to count the stepping pulses, a variable impedance means coupling each pair of consecutive circuits for providing a shunt path for said stepping pulses applied to the second circuit of the associated pair, each variable impedance means being controlled by the first circuit of the associated pair for interrupting the shunt path when the conducting condition of the first circuit is reversed, thereby assuring a cascaded counting operation by said chain in response to successive stepping pulses.

8. A multi-stage electronic counting chain, comprising, a plurality of cascade connected counting stages each occupying a first condition prior to the entry of a count therein and a second condition after the entry of a count, stepping means having connections for supplying stepping pulses to all stages effective at times to change a stage from its first to its second condition, a variable impedance means coupling each pair of consecutive stages and having normally a relatively low impedance path for shunting said stepping pulses away from the second stage of the corresponding pair, each impedance means being controlled by the first stage of the corresponding pair for raising the impedance to a relatively high value when that first stage occupies its second condition to interrupt the shunt path, thereby preparing the associated second stage for change to its second condition by the subsequent stepping pulse.

9. A multi-stage electronic counting chain, comprising, a plurality of cascade connected bistable circuits each comprising a pair of like transistors, a source of energy connected for supplying operating potentials for said transistors, a first and a second stepping pulse source having alternate connections to said bistable circuits for supplying successive stepping pulses thereto for at times reversing the conducting condition of a bistable circuit to enter a count in said chain, a third like transistor associated with each bistable circuit and having its conducting path connected in multiple with the like path of a selected one of the pair of transistors of the associated circuit, an intercircuit coupling for each consecutive pair of bistable circuits connected to a terminal of the nonselected transistor of the preceding circuit and to a control terminal of the third transistor of the succeeding circuit for biasing that third transistor to its conducting condition prior to the reversal of the conducting condition of the preceding circuit, each intercircuit coupling having connections to said energy source to bias the associated third transistor to its non-conducting condition after the conducting condition of the preceding circuit has been reversed, each said third transistor being effective in its conducting condition to cancel the effect of the stepping pulses applied to the associated bistable circuit thereby assuring the proper counting sequence of the counting chain.

10. A multi-stage electronic counting chain, comprising, a plurality of cascade connected bistable circuits each comprising a pair of like transistors a selected one of which pair is normally conducting, a source of energy for supplying operating potentials for said transistors, a first and a second stepping pulse source having alternate connections to the bistable circuits for supplying successive stepping pulses thereto for at times reversing the conducting condition of the pair of transistors of a single circuit to enter a count into said chain, an intercircuit coupling for each pair of consecutive circuits connected between a terminal of the selected transistor of the preceding circuit of the associated pair and the connection from the succeeding circuit of that pair to the corresponding stepping source, each said coupling being controlled by the selected transistor of the associated preceding circuit for shunting the stepping pulses supplied to the associated succeeding circuit only prior to the entry of a count into the preceding circuit of the pair, thereby effecting a cascaded advance of the entry of counts into said chain.

11. An electronic binary counting chain stage comprising two cascade connected bistable circuits each comprising a pair of like transistors and intracircuit cross connections, an input circuit for each bistable circuit with connections to each transistor of that circuit for supplying stepping pulses to the corresponding bistable circuit alternately with those pulses supplied to the non-corresponding bistable circuit, and a pair of intercircuit couplings connected between each input circuit and the noncorresponding bistable circuit and controlled by the noncorresponding bistable circuit for shunting each stepping pulse away from one transistor of the corresponding bistable circuit selected in accordance with the existing conducting condition of the transistors of the noncorresponding circuit to effect a change in the conducting condition of the transistors of the corresponding circuit which reverses that circuit from its existing stable condition to its opposite stable condition.

12. An electronic binary counting chain stage comprising two cascade connected bistable circuits each comprising a pair of like transistors and intracircuit cross connections, an input connection for each bistable circuits for supplying stepping pulses to the corresponding bistable circuit alternately with the stepping pulses supplied to the noncorresponding bistable circuit, each input connection being divided into two branch input circuits one for each transistor in the corresponding bistable circuit for applying the received stepping pulses to effect a change in the existing conducting condition of the associated transistor, and an intercircuit coupling between each branch circuit and a different transistor of the noncorresponding bistable circuit and including a variable impedance shunt path controlled by the noncorresponding bistable circuit for varying the impedance to selectively shunt the stepping pulses from the transistors of the corresponding bistable circuit in accordance with the conducting condition of the transistors of said noncorresponding bistable circuit to assure that the existing stable condition of the corresponding bistable circuit is reversed with each stepping pulse received over the associated input connection.

13. An electronic binary counting chain stage comprising two cascade connected bistable circuits each comprising a pair of like transistors and intracircuit cross connections, an input connection for each bistable circuit for supplying stepping pulses to the corresponding bistable circuit alternately with the stepping pulses supplied to the noncorresponding bistable circuit, each input connection being divided into two branch input circuits one for each transistor in the corresponding bistable circuit for applying the received stepping pulses to effect a change in the existing conducting condition of the associated transistor bistable circuit, and a variable impedance shunt path coupled to each branch circuit and controlled by a transistor of the noncorresponding bistable circuit for selectively shunting the received stepping pulses in accordance with the conducting and non-conducting condition of the associated transistor of said noncorresponding bistable circuit, each shunt path being so controlled as to shunt the stepping pulse when the associated transistor of the corresponding bistable circuit is in its conducting condition, thereby assuring that the existing stable condition of the corresponding bistable circuit is reversed by each stepping pulse received over the associated input connection.

No references cited.